United States Patent [19]

Palm

[11] Patent Number: 4,958,840
[45] Date of Patent: * Sep. 25, 1990

[54] SELF DISENGAGING KEYLESS CHUCK

[75] Inventor: Bernhard Palm, Brookfield, Wis.

[73] Assignee: Milwaukee Electric Tool Corporation, Brookfield, Wis.

[*] Notice: The portion of the term of this patent subsequent to Jul. 28, 2004 has been disclaimed.

[21] Appl. No.: 199,842

[22] Filed: May 27, 1988

[51] Int. Cl.$^5$ .............................................. B23B 31/12
[52] U.S. Cl. .................................... 279/62; 279/1 K; 408/240
[58] Field of Search ...................................... 279/60–65, 279/1 B, 1 K; 192/94; 74/424.8; 408/240

[56] References Cited

U.S. PATENT DOCUMENTS

| | | | |
|---|---|---|---|
| 2,504,018 | 4/1950 | Gibson et al. | 192/94 |
| 2,684,856 | 7/1954 | Stoner | 279/61 |
| 4,498,682 | 2/1985 | Glore | 279/61 X |
| 4,536,113 | 8/1985 | Hatfield | 409/234 |
| 4,682,918 | 7/1987 | Palm | 279/1 K |
| 4,840,387 | 6/1989 | McCarthy | 279/1 K |

*Primary Examiner*—Eugene F. Desmond
*Assistant Examiner*—Robert Schultz
*Attorney, Agent, or Firm*—Michael, Best & Friedrich

[57] ABSTRACT

An axially movable sleeve has interference members or lugs engageable with interference members or lugs associated with the split nut in a chuck. When the chuck is driven by the spindle, the axially movable interference members engage the split nut interference members and are restrained from rotation. The nut is also restrained and the chuck jaws open or close depending upon the direction of rotation of the chuck body. The sleeve is positioned to be engaged by the jaws as they approach full open position. The jaws then move the sleeve axially to disengage the interference members and stop further opening of the jaws before they reach a position to wedge or jam in the open position.

6 Claims, 2 Drawing Sheets

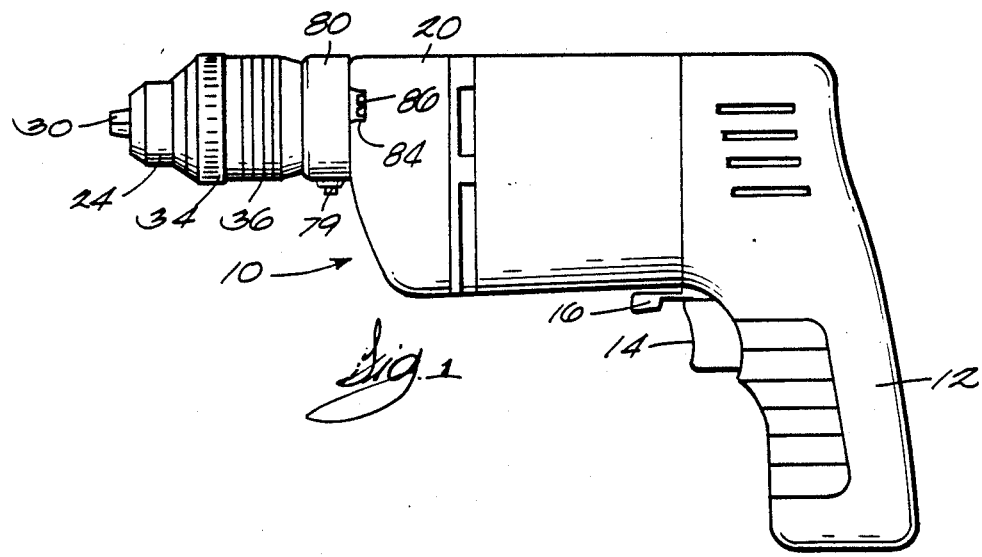
Fig. 1
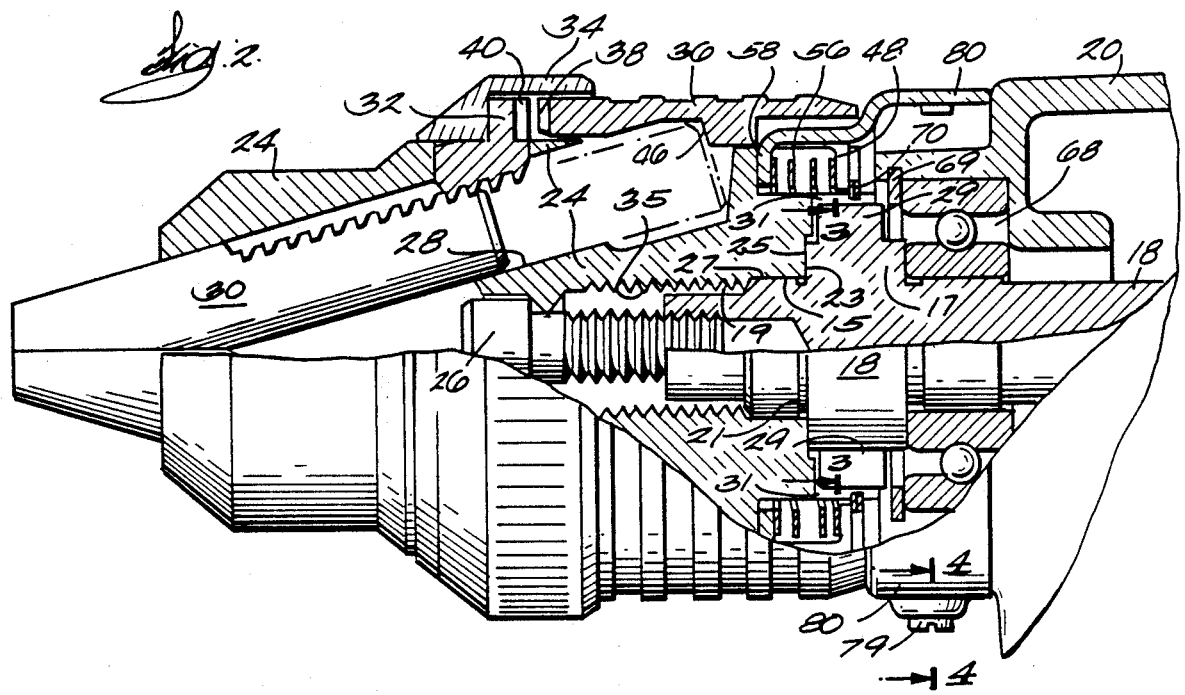
Fig. 2
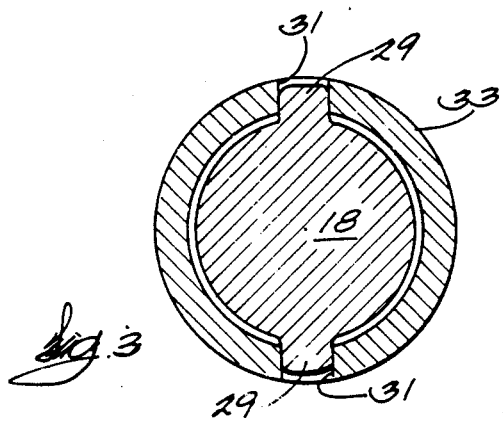
Fig. 3
Fig. 4

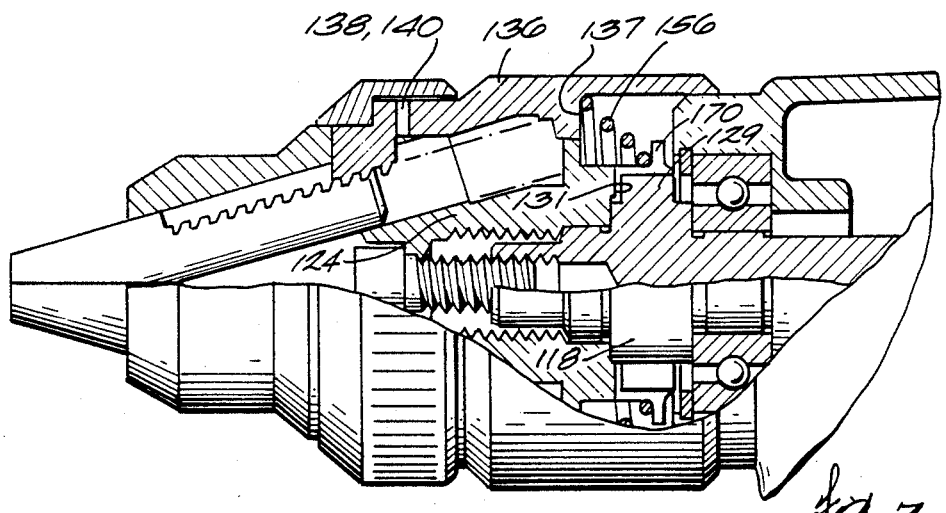

SELF DISENGAGING KEYLESS CHUCK

BACKGROUND OF THE INVENTION

Keyless chucks used on electric power drills and similar tools typically have impacting lugs which are brought into engagement to restrain rotation of the split nut in the chuck so that continued rotation of the body will move the jaws relative to the split nut to move the chuck jaws in the opening or closing direction, depending upon the direction of rotation of the chuck body. Typically, the impacting faces on the impacting lugs are inclined to the axis of the chuck at a different angle depending upon whether it is opening or closing the jaws. The impact angle is greater in the opening direction than in the closing direction, thus ensuring the force which can be delivered to open the jaws will always be greater than that which will be delivered to close the jaws. In theory this means it will always be possible to open the jaws to remove the tool. The drawback with this arrangement is possibility to drive the jaws open into wedging contact with the chuck body with such force that the force available in the closing direction cannot free the jaws.

The object of this invention is to solve this problem.

CROSS REFERENCE

This invention uses a clutch sleeve arrangement in which the sleeve is biased rearwardly to disengage the impact lugs. That is shown in my U.S. Pat. No. 4,682,918.

This invention is illustrated in conjunction with a novel construction having the interference members or lugs formed as a part of the split nut. That construction feature is claimed in my co-pending application Ser. No. 199,841, filed May 27, 1988. The drawings also disclose a novel mounting arrangement which is claimed in my co-pending Application Ser. No. 199,846.

SUMMARY OF THE INVENTION

This invention provides an actuating member operative to axially move interference members or lugs into or out of engagement with interference members or lugs associated with the split nut in a chuck. Assuming the chuck is driven by the spindle, when the axially movable interference members engage the split nut interference members and are restrained from rotation, the nut is also restrained and the chuck jaws open or close depending upon the direction of rotation of the chuck body. The actuating member is positioned to be engaged by the jaws as they approach full open position. The jaws then move the actuating member rearward to disengage the interference members and stop further opening of the jaws before they reach a position to wedge or jam in the open position.

More specifically, the actuating member is a sleeve on the chuck body. The sleeve has an inside groove engageable by the jaws. The groove is shaped to present a surface generally normal (perpendicular) to the jaw travel.

A further feature is that the axially movable interference members are a part of the sleeve.

BRIEF DESCRIPTION OF THE DRAWINGS

FIG. 1 is a side elevation of a power drill fitted with a chuck incorporating this invention.

FIG. 2 is a vertical section through the chuck mounted on a novel drive spindle.

FIG. 3 is a section taken on line 3—3 in FIG. 2.

FIG. 4 is a section taken on line 4—4 in FIG. 2.

FIG. 5 is a fragmentary schematic view of the lugs.

FIG. 6 is a vertical section through a slightly modified chuck (not modified relevant to the mount) threaded on a standard threaded spindle.

FIG. 7 is a vertical section through still another chuck.

DETAILED DESCRIPTION OF THE DRAWINGS

The hand drill 10 has a conventional pistol grip 12, a trigger 14 actuating the power switch and a forward-/reverse control 16. Gear case 20 is mounted on the front portion of the drill housing by screws 86 and encloses the customary reduction gearing. Grooves 84 in case 20 give screwdriver access to screws 86. Drive spindle 18 projects out of the front of the gear case 20 and is journaled in bearing 68 retained by tru-arc retainer 69.

The spindle has a smooth cylindrical mount 15 beyond shoulder 17 and a reduced diameter end 19 beyond the mount 15. The spindle is reduced at 21 between mount 15 and shoulder 17 to ensure that face 23 can be squarely engaged by shoulder 25 on chuck body 24 when the smooth bore 27 in the body is mounted on the mount 15. When so mounted the diametrically opposed lugs 29 on spindle 18 engage the slots 31 in the body flange. The threaded bore 35 in the body fits over the reduced end 19 of the spindle 18. The threads 35 serve no purpose at this time; they are used to mount the chuck on a mandrel during production of the chuck to enable final grinding of the jaws concentric with the chuck body so the jaws will be concentric with the spindle 18 when the chuck is mounted on a spindle. The chuck is retained on the spindle 18 by screw 26 threaded into the end of the spindle. No torque is transmitted through the threaded connection of the chuck to the spindle through screw 26. All torque is transmitted through the drive lugs 29. Therefore, the chuck is easily removed by pulling it off and when driven in reverse screws (like 26) can no longer break. This mount is applicable to keyed and to keyless chucks.

The body is provided with three inclined bores 28 in each of which there is mounted a jaw 30 which moves in the inclined bore 28 in response to relative rotation between the split nut 32 and the jaws. Split nut 32 is retained in assembled position by split nut retainer 34 which is in the form of a ring-like collar having a force fit on the split nut. The retainer 34 and the split nut normally rotate with the body 24, but if the split nut and retainer are restrained from rotation the rotation of the body relative to the split nut will cause the jaws 30 to open or close by moving up or down the inclined bore as determined by the direction of the rotation of the body.

Clutch sleeve 36 is provided with lugs 38 facing lugs 40 on the split nut 32. If the clutch sleeve 36 is moved to the left in FIG. 2, lugs 38 engage lugs 40. The right end of sleeve 36 has inwardly projecting flange segments 48 and a spline ring 80 has inturned flange segments 58 which fit between segments 48 with spring 56 compressed between the spring seats thus provided. Spline ring 80 can be restrained against rotation by tightening screw 79 into nut 81 until it firmly engages gear case 20. This restrains the sleeve 36 against rotation. Therefore, when the sleeve lugs 38 engage the split nut lugs 40, the split nut 32 will also be restrained against rotation causing relative rotation between the body 24 and the split nut 32. This will cause the jaws 30 to move up or down the inclined bores 28 to open or close the jaws depending upon the direction of rotation of the clutch body 24.

In FIG. 5 details of lugs 38 and 40 are shown. The jaws 30 will open or close depending upon whether spindle 18 and chuck body 24 are being driven in the forward (F) or reverse (R) direction. Assume the chuck is being driven in the forward (F) direction. Interengaging faces 42, 44 on lugs 38, 40, respectively, are inclined at 27° with respect to the axis of the chuck, as seen in FIG. 5. This is a rather steep angle and will deliver a very sharp impact to the lugs 40 tending to forceably close the jaws. When the jaws grip a tool and cannot move, the face angles will act to cam the clutch sleeve 36 towards the gear case to disengage the lugs. If the operator continues to push the clutch sleeve 36 towards the split nut, non-rotating lugs 38 will re-engage the split nut lugs 40 and deliver repeated impacts. This will repeat as long as the operator persists. This construction will deliver sufficient closing force to the jaws to meet all normal requirements.

Opening the chuck is another matter. In this design the forward/reverse switch 16 is actuated to now drive the chuck in reverse direction (R). This means that when the axially movable sleeve 36 is actuated to bring the non-rotating lugs 38 into engagement with the split nut lugs 40, the inclined faces 64, 66 are inclined at 23° to the axis of the chuck, as may be seen in FIG. 5. This is 4° less than the angle in the jaw closing configuration. This will develop more tangential force on the split nut 32 in the direction opening the jaws than obtained with the 27° face angle in the closing direction. Therefore, opening is assured and there is no need to provide for operation of the chuck with a key or a chuck wrench. The system will deliver sufficient, repeated impacts to open the chuck. It may not open on the first impact, but with the operator holding the sleeve forward, a rapid series of impacts will be delivered until the chuck opens.

An impact can be considered a force spike of much greater magnitude than the friction between the parts. A problem arises, however, if the operator holds the sleeve 36 to drive the jaws 30 to the full open position. Without the present invention, this can result in the jaws wedging in the open position. Since they have been driven open with an impact greater than can be delivered in the closing direction, they can be irrevocably wedged in the open position. This problem is obviated in the present design by locating the clutch sleeve in position to be engaged by the jaws and providing the undercut 46 inside the clutch sleeve 36 in position to receive the inner end of each jaw 30, as shown in dotted lines in FIG. 2. This, then, permits the jaws to drive against the clutch sleeve 36 to push the sleeve to the right to disengage lugs 38 from lugs 40 before there is opportunity to wedge the jaws open. This automatic disengagement prevents a user from inadvertently locking the jaws in the open position. It will be noted that the inner end of jaw 30 has contact with the sleeve in a plane normal to the jaw movement and wedging is not possible.

Reference has been made to the fact that the sleeve 36 is biased rearwardly (to the right). That construction will now be described. The flange segments 48 on the right hand end of the sleeve 36 form a spring seat for the compressed spring 56. The spring also seats on segments 58 which are axially fixed. Therefore the spring biases the sleeve 36 to the right with retainer ring 70 limiting travel to the right. The clutch sleeve 36, spring 56, ring 70 and ring 80 are assembled on the chuck before the chuck is mounted on the spindle.

Another important feature is the nature of the clutch sleeve 36. The spline ring 80 prevents rotation of the clutch sleeve and when the user pushes the sleeve forward to engage the lugs the sleeve is subject to reciprocating motion as the lugs engage, impact and push the sleeve back and then the user pushes it forward again. If desired the ring 80 can be allowed to rotate. This will result in the clutch sleeve being free to rotate slightly due to impact. The slight rotational force imparted to the sleeve is resisted by the user who can't detect or feel the difference. There is some loss of impact force or magnitude due to the slight rotation of the sleeve on impact.

There are many drills in the field which don't have the grooves leading to the screws. Therefore, a keyless chuck mounted without means to restrain rotation of the clutch sleeve 36 remains a desirable product.

The mounting of the chuck on the smooth cylinder and driving the chuck through the lugs prevents wedging the chuck on the spindle. Screw 26 will not wedge or jam; it transmits no torque, it only retains the chuck on the spindle. Chuck removal is easy and yet the design retains the threads 35 necessary to proper finish grinding of the jaws concentric with the chuck spindle. It is important to note that without any modification to the chuck the threads 35 can be used to mount the chuck on threaded spindles of existing tools.

This is illustrated in FIG. 6 in which spindle 118 has only the threaded end 115 which threads into the body threads 35 until the shoulder 25 seats against shoulder 127. There are no drive lugs in this configuration ... the drive is transmitted through the threads and this entails the drawbacks mentioned above. The construction has a ready market in all the threaded spindle tools in the field. This chuck also omits the spline ring 80 of FIG. 2 which means sleeve 36 is free to rotate but can be restrained by the user with little force. The chuck still offers the advantage of avoiding delivering impact force through the press fit and providing automatic disengagement.

The important feature of this invention is the automatic disengagement of the sleeve before the jaws have an opportunity to get wedged in the full open position. Another important feature of this invention is the nature of the clutch sleeve 36. The spline ring 80 prevents rotation of the clutch sleeve and when the user pushes the sleeve forward to engage the lugs the sleeve is subject to axial reciprocating motion as the lugs engage, impact and push the sleeve back and then the user pushes it forward again. The cost of restraining rotation can be avoided by omitting the spline ring. This will result in the clutch sleeve being free to rotate. The slight rotational force imparted to the sleeve is resisted by the user who can't detect or feel the difference. There is some loss of impact force or magnitude due to the slight rotation of the sleeve on impact. Also, some users are reluctment to grasp a rotating part and for them the non-rotational sleeve is preferred.

Another variation, and a great simplification, is shown in FIG. 7 in which spring 156 biases the sleeve 136 to engage the lugs 138, 140 at all times with the jaws still operative to disengage the lugs before they can jam open. Spring 156 is compressed between the corner 137

(inside the sleeve) and the shoulder 170 machined on the body 124. This is the lug drive version but it can be either. The lugs 129 engage the recesses 131. The sleeve 136 normally rotates with the chuck and the user then restrains the sleeve to open or close the chuck.

The sequence of the drawing figures parallels this development and FIG. 7 represents the final (current) design. This is more compact and "looks" more conventional. It still mounts on threaded or unthreaded spindles, automatically disengages, and avoids torque transmission through the press fit.

This design also has an advantage in that the radial slots 131 permit screw driver blade access to the spring 156 when the chuck is off the drive spindle. The spring can be removed for service in this manner. The chuck can't be mishandled to damage the spring when the chuck is off the tool. Thus, if the sleeve is pulled back, spring 156 "goes solid" and limits sleeve travel and this in turn prevents overstressing the spring.

What is claimed is:

1. A chuck comprising,
   a chuck body having an axis of rotation and a front,
   three jaws mounted on said body on axes converging forwardly and inclined relative to said axis of rotation and equally spaced around the body, said axes being positioned relative to the axis of the chuck body so that the jaws move inwardly on said converging axes toward a fully closed position and outwardly on said axes towards a fully open position,
   a split nut mounted on said body for rotation relative to said body and encircling said jaws, said split nut having a threaded connection with the jaws whereby said jaws move on said inclined axes between said fully closed position and said fully open position in response to relative rotation between said body and said split nut,
   a retainer having a press fit on said split nut to retain said split nut assembled,
   a sleeve having an inside and an outside and mounted on said body for axial movement relative to said body,
   first and second interference members,
   said first interference members being integral with said sleeve,
   said second interference members facing rearwardly and being integral with said split nut and being engaged by said first interference members as said sleeve moves axially forwardly on said body,
   said outside of said sleeve being manually engaged to move said sleeve axially,
   said jaws being engageable with said inside of said sleeve as the jaws approach said fully open position so that the sleeve is moved rearwardly to disengage said first interference members from said second interference members.

2. The combination according to claim 1 including an undercut groove on said inside of said sleeve in alignment with said jaws when said interference members are engaged so said jaws will push against said groove as said first interference members are disengaged from said second interference members.

3. The combination according to claim 2 in which said groove includes a surface generally normal to the path of said jaws so the jaws act on such surface to actuate said sleeve to disengage said interference members.

4. The combination according to claim 3 in which said sleeve has a front facing forwardly and said first interference members are on the front of said sleeve.

5. The combination according to claim 1 including means restraining said sleeve from rotation with said chuck body.

6. The combination according to claim 5 including means biasing said sleeve away from said split nut.

* * * * *